(12) United States Patent
Meier

(10) Patent No.: US 8,900,493 B2
(45) Date of Patent: Dec. 2, 2014

(54) WASTE TREATMENT METHOD AND CORRESPONDING DEVICE

(75) Inventor: Leif Ole Meier, Jork (DE)

(73) Assignee: CFK Valley Stade Recycling GmbH & Co. KG, Wischhafen (DE)

( * ) Notice: Subject to any disclaimer, the term of this patent is extended or adjusted under 35 U.S.C. 154(b) by 362 days.

(21) Appl. No.: 12/991,472

(22) PCT Filed: May 4, 2009

(86) PCT No.: PCT/DE2009/075019
§ 371 (c)(1),
(2), (4) Date: Nov. 8, 2010

(87) PCT Pub. No.: WO2009/135486
PCT Pub. Date: Nov. 12, 2009

(65) Prior Publication Data
US 2011/0057341 A1    Mar. 10, 2011

(30) Foreign Application Priority Data
May 8, 2008    (DE) .......................... 10 2008 002 846

(51) Int. Cl.
| | | |
|---|---|---|
| *D01F 13/00* | (2006.01) | |
| *B29B 17/02* | (2006.01) | |
| *B29B 15/12* | (2006.01) | |
| *B29B 17/04* | (2006.01) | |
| *B29K 105/06* | (2006.01) | |
| *B29K 707/04* | (2006.01) | |

(52) U.S. Cl.
CPC .............. *B29B 17/02* (2013.01); *B29B 15/125* (2013.01); *B29B 15/127* (2013.01); *B29B 17/0412* (2013.01); *B29B 2017/0293* (2013.01); *B29B 2017/0496* (2013.01); *B29K 2105/06* (2013.01); *B29K 2707/04* (2013.01)

USPC ........................................................ 264/37.28

(58) Field of Classification Search
USPC ........................................................ 264/37.28
See application file for complete search history.

(56) References Cited

U.S. PATENT DOCUMENTS

| | | |
|---|---|---|
| 2002/0017162 A1 | 2/2002 | Dannenhauer et al. |
| 2007/0017255 A1 | 1/2007 | Grove-Nielsen |

FOREIGN PATENT DOCUMENTS

| | | |
|---|---|---|
| DE | 4112172 A1 | 8/1992 |
| DE | 4222710 A1 | 3/1994 |
| DE | 19514543 C1 | 3/1996 |
| DE | 10026761 C1 | 1/2002 |
| EP | 0443051 A | 8/1991 |
| EP | 0636428 A1 | 2/1995 |

OTHER PUBLICATIONS

Miller A., Bibson A.G.: "Impregnation Techniques for Thermoplastic Matrix Composites" Plymers and Polymer Composites, RAPRA Technology, vo. 4, No. 7, Jan. 1, 1996, pp. 459-481, XP000658227 ISSN: 0967-3911, p. 463; figure 5 Cited as "A" category in ISR dated Oct. 14, 2009.

*Primary Examiner* — Larry Thrower
(74) *Attorney, Agent, or Firm* — Patent Central LLC; Stephan A. Pendorf

(57) ABSTRACT

The present invention relates to a recycling process for recycling fiber-reinforced and/or fiber based semi-finished products and/or components for later use in the production of fiber-reinforced and/or fiber based semi-finished products and/or components, wherein the semi-finished products and/or components are comprised of fibers and a matrix material, and the fibers are arranged in the matrix material in the form of a fabric, unidirectional layers and/or plies and/or individual reinforcing fibers and/or reinforcing fiber bundles, and further, a device for carrying out the recycling process.

13 Claims, 1 Drawing Sheet

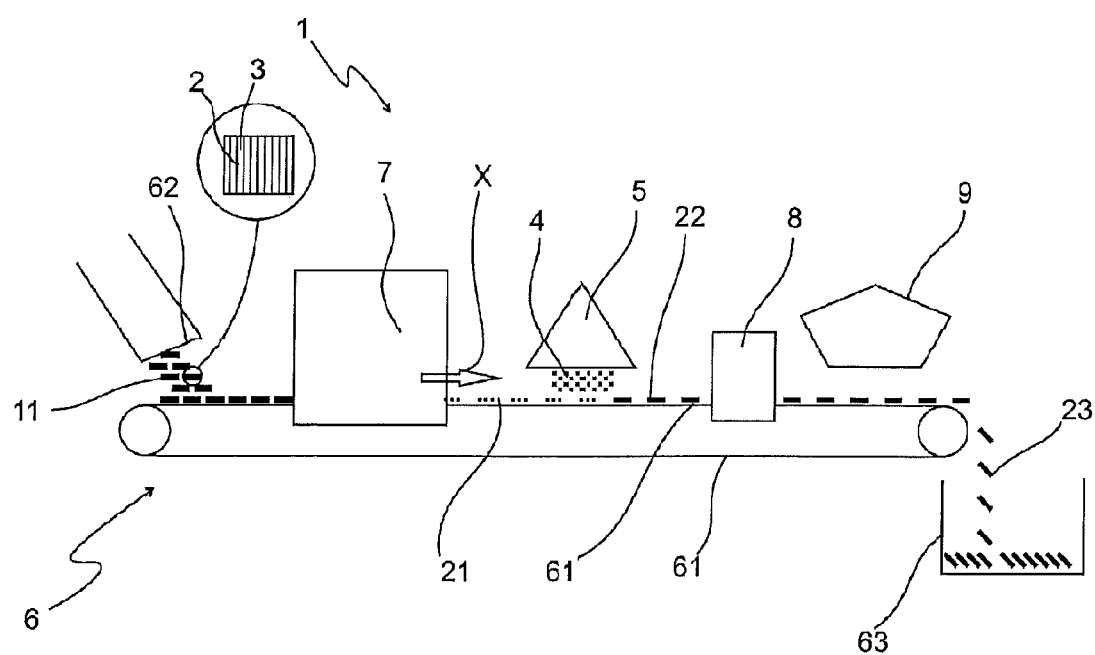

WASTE TREATMENT METHOD AND CORRESPONDING DEVICE

The present invention relates to a recycling process for recycling fiber-reinforced and/or fiber containing semi-finished products and/or components for later use in the production of fiber-reinforced and/or fiber containing semi-finished products and/or components, wherein the semi-finished products and/or components are comprised of fibers and a matrix material, and the fibers are arranged in the matrix material in the form of a fabric, unidirectional layers and/or plies and/or individual reinforcing fibers and/or reinforcing fiber bundles, and further, a device for carrying out the recycling process.

Fiber-reinforced plastic components have been used for several decades in civil and military aircraft construction, in the realm of sports, in wind power generation or in automobile as a lightweight construction material. The major advantages of fiber-reinforced plastics is their excellent mechanical properties and their low density. This represents a considerable weight saving compared with conventional materials. In particular, reference is made at this point to the special characteristics of carbon fiber reinforced plastics (CFRP), which are currently experiencing an unanticipated volume of market demand.

With the constant demands being made on fiber-reinforced plastics, it can be anticipated that lightweight materials will reach limits of use. A problem that presents itself with some urgency is the practical reuse of fiber-reinforced plastics. In particular in the automotive industry the development of recycling processes is a necessity, since governmental regulations on recycling of old cars require the better part of a vehicle to be reusable.

Various separation techniques are known in prior art for use in recycling of fiber-reinforced plastics. The following are the four most important separation methods: solvolysis; catalysis, hydrolysis, and pyrolysis, wherein the most promising method on an industrial scale is pyrolysis for dissociation of the plastic matrix at temperatures above 350° C. into smaller organic molecules which evaporate.

The fibers recovered through a recycling process can be introduced back into the cycle of materials, to be incorporated into new plastics.

DE 100 26 761 C 1 describes a process for recycling of semi-finished products or components made of fiber composite materials. Therein a separation of the matrix bonded fiber material into free fibers takes place, so that they are present without the matrix material. The separation is performed by an input of energy into the recycled fiber composite material via electromagnetic waves, especially microwaves. Since the matrix conventionally has a stronger absorption of electromagnetic waves, this leads to a selective heating of the matrix, which leads to decomposition of the matrix and the separation of fibers and matrix. Further, for improving separation, a solvent can be added.

The DE 4 1 12 172 A1 discloses a method for producing a reprocessable fiber composite material made of thermoplastic material. This development is in response to the object to provide a fiber composite material that forms after recycling no mixture of different ingredients, but rather a uniform grade of plastic that can be used in particular as a matrix material for the formation of a new fiber composite material. As the reinforcing fiber, synthetic fibers of a thermoplastic material are used, of which the structure is at least very similar to that of the matrix material. In particular, it is now possible to later recycle the thus-prepared composite material, since there are no different materials, but rather only plastics, namely, synthetic fiber and matrix material.

From EP 0 636 428 A 1 (document D5) a process for recycling of carbon-fiber-containing composite materials is known. In the herein described methods parts from the carbon fiber reinforced composite materials are processed so that a new starting material consisting of carbon fibers, which are bound by a carbon matrix, is formed. This starting material is carbonized to form a new carbon fiber reinforced composite material with carbon matrix (CFC) by means of a suitable binder. In order to maximize the carbon yield, a relatively low temperature gradient and a long carbonizing time of about 1 week at maximum temperatures between 800 and 1200° C. is used. In each case, with this method, carbon fiber reinforced composites based on carbon matrix are produced, for example, for brake and friction materials, thermal insulation plates for high temperature furnaces, etc.

In practice, currently fibers are ground after their separation from the matrix, in order to be reintroduced into the material cycle. The problem here is the quality of the recycled fibers, which degrades after the pyrolysis and grinding processes. As an alternative to the grinding of fibers, attempts have been made to unravel the fibers after the pyrolysis process, since these were previously interwoven with each other in a component to form fabric and reinforcing layers. The separation of such structures after pyrolysis is currently not possible since entanglements, the so-called pilling, form, which can subsequently hardly be untangled. Thus, the processing of recovered fiber reinforcement is impossible.

The present invention has the objective to provide a method and a system making it possible to recycle into the production cycle fiber-reinforced and/or fiber-based semi-finished products, which suffered a defect during the production of components or which have reached a predetermined expiration date, and/or fiber-reinforced and/or fiber-based components that are, for example, at the end of their life cycle, were defectively produced, or damaged in such a manner that they can no longer be used for their original intended purpose, in such a manner that the fibers reclaimed in the recycling process can be returned into the production cycle.

This problem is solved by a method according to claim 1 and a device according to claim 13.

Because the above-mentioned method includes the steps: separation of the matrix material bonded fibers covered by the matrix material into free fibers and bathing the free fibers after separation with a binder for coating of fibers, the result is recycled reinforcing fibers in the form of packages of coated fibers with no entanglements, the so-called pillings.

The fibers in this case have the same fabric structure or orientation as the original fiber-reinforced and/or fiber-based semi-finished products and/or components. These thus-derived recycled fibers are useful in the further production of fiber-reinforced semi-finished and/or plastic components. Particularly important herein is that the free fibers, after separation from the matrix up to wetting with a binder, are no longer handled, that is, are not moved.

If, prior to the separation of the fibers from the matrix material, the fiber-reinforced and/or fibrous semi-finished products and/or components are cut, such that the cut fiber-reinforced and/or fiber-based semi-finished products and/or components have an edge length in the range of 6-60 mm, then fiber bundles are produced, which have at least a similar length, so that they can be used commensurate to their length in a subsequent process for manufacturing fiber-reinforced plastic components.

In order to obtain a stack of fibers or wetted fibers in unidirectional layer stacks for further processing, the fibers or the wetted fibers are longitudinally oriented and aligned to each other and/or separated into oriented or fabric structures.

Similarly oriented fibers in a stack fiber arrangement are easier to handle and easier to dispense or meter and manipulate during a further processing during manufacture of a fiber-reinforced plastic component, as well as easier to control by means of computer software (stiffness, strength of the overall component).

If, for wetting of the free fibers with the binder medium, the free fibers are passed through a bath filled with the binder and thereby become wetted fibers, the free fibers do not experience any relative motion after the pyrolysis process. Thereby entanglement, the so-called pilings, can be prevented. Alternatively, for wetting the free fibers with the binder, the free fibers can be sprayed with the binder to become wetted fibers. The free fibers can be moved, without relative motion to each other, via the transport system under the spray stream.

If the free fibers separated from the matrix material are cooled before wetting with the binder below a binder-dependent maximum temperature, wherein the maximum temperature of the free fibers is below the evaporation temperature of the binder or other additives, is then the bond between the fibers and the binder is maximized. At the same time, evaporation of the binder is prevented.

To maximize the unidirectionality of the reinforcing fibers, the layers/fabric structures of the wetted fibers are separated into fiber bundles and/or the wetted fibers are oriented and aligned to each other in the longitudinal direction forming fiber bundles.

If the fiber bundles are cut to length perpendicular to the direction of the fibers, the result is a deliverable end product, wherein, in the case that the fibers are of unidirectional orientation, all of the fibers have the same length. At the same time, it is also possible in the case of unidirectional semi-finished products, in which the fibers are separated from the matrix material by means of the described recycling process, to not cut the free fibers, but rather to further process them as a continuous fiber.

Thereby, that the fiber-reinforced and/or fiber-based semi-finished products and/or components to be recycled are sorted prior to the separation, wherein the separation according to materials, semi-finished products and components occurs in each case on the basis of the same fiber, fiber type, in particular fabric and/or unidirectional plies, and/or matrix material, it is possible to bundle different categories of fibers, in order to prevent a mixture of different fibers. Likewise, process optimization can be performed, since for example, in the case of a plastic that can be separated at lower temperatures, the temperatures can be kept lower during the separation, and thus the resources can be safeguarded. Also, in the case of pre-sorting according to fabric and according to unidirectional fiber layers, an optimization of the subsequent alignment is brought about.

If, for separation of the fibers from the matrix material, the fiber-reinforced and/or fiber-based semi-finished and/or components are subjected to a pyrolytic process, then a continuous oven process can be utilized, in that fiber-reinforced or fiber-based semi-finished products and/or components can be recycled, for example, even around the clock. However, methods similar to pyrolysis can also be used, for example, including the chemical separation of matrix and fiber material. Here a batch, as well as an continuous process, can be carried out.

If the wetted free fibers are dried after wetting the with the binder, the fibers are wetted, then free-flowing pile fibers can be generated that can be used for later production of new parts. Clumping is prevented by the immediate drying.

To avoid pilling it is sufficient to wet the fibers to a binder content of 3 weight percent. For further use, however, a binder content between 3 and 30 weight % is optimal, since thereby a sufficient plastic density in the later product can be achieved.

A device for carrying out the recycling process preferably has a transport device to transport the fibers to be recycled in the process direction, a separating device for separating fibers and matrix materials and a wetting arrangement provided downstream in the process direction.

If, for the direct wetting of the fibers, a dip bath filled with the binder is provided through which to pass the free fibers, whereby these are made into wetted fibers, then the free fibers are wetted with the binder in an economical manner. For this purpose it is advantageous if the transport system is designed such that it can move at a variable speed. This allows the setting of individual degrees of wetting. The individual degree of wetting can also be adjusted by varying the binder mixture. For this purpose, the amount of solvent in the sprayed binder solution can be varied. Alternatively, the amount of binder solution sprayed per unit time can be varied.

The binder, which can be applied to the fibers by dipping or by spraying, can, depending upon the design of the transport device, simply penetrate and pass through the fibers, or in the case of an appropriate design of the transport means, can dwell therein so that larger quantities of plastic are incorporated in the fibers.

By the provision of a spray device for wetting of the fibers immediately subsequent to the separation device, the binder can be applied onto the free fiber from above as an alternative to a bath of the binder spray. Herein a metering or dosing of the applied amount of binder is possible.

If a dissociation or combing device is provided subsequent to the wetting device, then non-parallel lying unidirectional fibers can be aligned or oriented in one direction and fabrics can be dismantled.

If the dissociation or combing device is formed of sharp cutting wedges oriented parallel to each other in the process direction, wherein the tips of the cutting wedges point contra to the process direction, then the more or less isolated fibers can be assembled together into fiber bundles.

If the dissociation or combing device consists of at least two individual combs, which in particular comb the fabric in opposite directions perpendicular to the process direction, the fabric mesh can be separated and be processed into stacks or piles of fibers.

If the separator device to separate the fibers from the matrix material involves pyrolysis using a continuously operating furnace arrangement, wherein the free fibers experience no movement and/or position change relative to the transport device during the pyrolysis process, the fibers can be processed continuously.

If the transport device has a heat-resistant conveyor belt, the fibers can be moved continuously through the entire arrangement without movement relative to each other. The use of a heat-resistant conveyor belt facilitates transport through the separator assembly. Further, the conveyor belt may be designed such that excess binder penetrates through the conveyor belt during or after the wetting process, and is collected therebelow for further use.

If the binder is comprised of a solvent, preferably an organic solvent and a technical plastic, preferably a polymer, dissolved in the solvent, then the binder can be easily dispensed, processed, and reclaimed.

If drying arrangement is provided for drying the wet fibers after wetting, a compact process route results, since otherwise a longer period for drying of the wetted fibers would be needed to prevent sticking together of individual stacked fiber packages.

If the dryer assembly consists of a radiant heat source and/or a hot air blower, an economical drying arrangement can be implemented. For example, a combination of the drying arrangement and the separation arrangement would be conceivable, in which the process heat of the separator assembly is used for drying arrangement.

In the following an embodiment of the invention is described in detail with reference to the accompanying drawings.

Therein there is shown:

FIG. 1 a schematic representation of the recycling arrangement.

In FIG. 1 a schematic representation of an embodiment of the recycling system 1 is shown. The recycling system 1 includes of a transport device 6, which here is a conveyor belt 61. The conveyor belt 61 serves to transport the fiber-reinforced and/or fiber based semi-finished products and/or components 11 fed to it by means of a feeding device 62 within the recycling arrangement 1 and thus for guiding from one process station to another.

After the fiber-reinforced and/or fiber based semi-finished products and/or components 11 have been supplied to the conveyor belt 61, the conveyor belt moves these to a separator assembly 7. Within this separator assembly 7, which can be for example a furnace arrangement, the fiber-reinforced and/or fiber based semi-finished products and/or components 11, which are comprised of a fiber 2 and a matrix material 3, are separated in such a manner, so that a free fiber 21 remains. The free fibers are 21 lie as originally within the fiber-reinforced and/or fiber based semi-finished products and/or component, and more precisely, the fabric structure and/or ply orientation is unchanged.

After the free fibers 21 have left the separator assembly 7 on the conveyor belt 61, they are forwarded to the wetting arrangement 5. The wetting arrangement 5 can be configured as a bath (not shown here) or, for example, as a spray arrangement, as shown here. Just before a binding agent 4, which consists of a solvent and a technical plastic, is applied to the free fibers 21 by means of wetting arrangement 5, they must be below a maximum temperature, which depends on the evaporation temperature of the binder. In this step, the free fiber 21 is made into a wetted fiber 22. The fiber is now covered with a technical plastic, which may for example be a polymer. The design of technical plastic depends on the future use of the now plastic encased fiber.

By means of the conveyor 6, the wetted fibers 22 are guided through a dissociation or combing device 8 with cutting wedges and combs, which ensures that the fabric structure and/or the separated fibers are oriented or dissociated appropriately, then, that after passing through the dissociation or combing device 8, fibers 22 wetted with the binder 4 are oriented and present in small stacks.

Next there occurs the transporting to the dryer assembly 9, which is realized for example by a heat radiator or a warm air blower. Here, the fiber bundles 23, which are comprised of the fibers 22 wetted by means of the binder 4, are dried. This results in a free-flowing product which is collected in a collection container 63 at the end of the conveyor segment of transport device 6. The process of the here illustrated process is indicated here by the arrow X.

Reference List
1 Recycling device
11 Fiber reinforced or fiber based semi-finished product and/or component
12 cut reinforced or fiber based semi-finished product and/or component
2 Fiber
21 Free fiber
22 Wetted fiber
23 Fiber bundle
3 Matrix material
4 Binder
5 Wetting device
6 Transport device
61 Conveyor belt
62. Supply device
63 Collection container
7 Separating device
8 Dissociation or combing device
9 Drying device
X process direction

The invention claimed is:

1. A recycling process for recycling fiber-reinforced and/or fiber based semi-finished products and/or components (11) for later use in production of fiber-reinforced and/or fiber based semi-finished products and/or components, wherein the semi-finished products and/or components (11) are comprised of fibers (2) and a matrix material (3) and the fibers (2) are arranged in the matrix material (3) as fabric, unidirectional layers and/or plies and/or individual reinforcing fibers and/or reinforcing fiber bundles, comprising
   providing fiber-reinforced and/or fiber based semi-finished products and/or components (11) to be recycled, wherein fiber (2) is bonded by matrix material (3),
   separating the fiber (2) from the matrix material (3) to form free fibers (21) without changing the structure or orientation of the fibers, and
   immediately after separation, and without moving the fibers relative to each other, wetting the free fibers (21) with a binder (4) to form wetted fibers (22) having the structure and orientation of the recycled fiber-reinforced and/or fiber based semi-finished products and/or components (11).

2. The recycling process according to claim 1, wherein prior to the separation of the fibers (2) from the matrix material (3), the fiber-reinforced and/or fiber based semi-finished products and/or components (11) are cut, whereby the cut fiber-reinforced and/or fiber based semi-finished products and/or components (12) exhibit an edge length of 6 - 60 mm.

3. A recycling process for recycling fiber-reinforced and/or fiber based semi-finished products and/or components (11) for later use in production of fiber-reinforced and/or fiber based semi-finished products and/or components, wherein the semi-finished products and/or components (11) are comprised of fibers (2) and a matrix material (3) and the fibers (2) are arranged in the matrix material (3) as fabric, unidirectional layers and/or plies and/or individual reinforcing fibers and/or reinforcing fiber bundles, comprising
   providing fiber-reinforced and/or fiber based semi-finished products and/or components (11) to be recycled, wherein fiber (2) is bonded by matrix material (3),
   separating the fiber (2) from the matrix material (3) to form free fibers (21) without changing the structure or orientation of the fibers,
   immediately after separation, and without moving the fibers relative to each other, wetting the free fibers (21) with a binder (4) to form wetted fibers (22) having the structure and orientation of the fibers of the recycled fiber-reinforced and/or fiber based semi-finished products and/or components (11), and
   orienting and arranging the wetted fibers (22) in the longitudinal direction relative to each other and/or separating the plies or fabric structure.

4. The recycling process according to claim 1, wherein for wetting the free fibers (21) with the binder (4) the free fibers (21) are passed through a binder (4) filled bath and thus made into wetted fibers (22).

5. The recycling process according to claim 1, wherein for wetting the free fibers (21) with the binder (4) the free fibers (21) are sprayed with the binder (4) and thus made into wetted fibers (22).

6. The recycling process according to claim 1, wherein the free fibers (21) separated from the matrix material (3) are cooled before wetting with the binder (4) to a temperature below a binder (4) dependent maximum temperature, wherein the maximum temperature of the free fibers (21) lies below the evaporation temperature of the binder (4).

7. The recycling process according to claim 1, wherein the plies or fabric structure the wetted fibers (22) is separated or resolved into fiber bundles (23) and/or the wetted fibers (22) are oriented and aligned relative of each other into fiber bundles (23).

8. The recycling process of claim 7, wherein the fiber bundles (23) are cut to length perpendicular to the direction of the fiber orientation.

9. The recycling process according to claim 1, wherein, prior to separation, the fiber-reinforced and/or fiber based semi-finished products and/or components (11) are sorted, wherein the sorting is based on the type of fiber and/or matrix material.

10. The recycling process according to claim 1, wherein for separating the fibers (2) from the matrix material (3) the fiber-reinforced and/or fiber based semi-finished products and/or components (11) are subjected to a pyrolysis process.

11. The recycling process according to claim 1, wherein after wetting the free fibers (21) with the binder (4) the wetted fibers (22) are dried.

12. The recycling process according to claim 1, wherein the binder content is between 3 and 30 weight percent of the binder (4) wetted fibers (22).

13. A recycling process for recycling fiber-reinforced and/or fiber based semi-finished products and/or components (11) for later use in production of fiber-reinforced and/or fiber based semi-finished products and/or components, wherein the fiber-reinforced and/or fiber based semi-finished products and/or components (11) are comprised of fibers (2) and a matrix material (3) and the fibers (2) are arranged in the matrix material (3) as fabric, unidirectional layers, plies and/or bundles, comprising providing fiber-reinforced and/or fiber based semi-finished products and/or components (11) to be recycled, wherein fiber (2) is bonded by matrix material (3), separating the fiber (2) from the matrix material (3) to form free fibers (21) without changing the structure or orientation of the fabric, unidirectional layers, plies or bundles, and wetting the free fibers (21) with a binder (4) immediately after separation, and without moving the free fibers relative to each other, the free fibers retaining the structure and orientation of the fabric, unidirectional layers, plies or bundles of the fiber-reinforced and/or fiber based semi-finished products and/or components, to form wetted fibers (22) having the structure and orientation of the fabric, unidirectional layers, plies or bundles of the fiber-reinforced and/or fiber based semi-finished products and/or components.

* * * * *